July 21, 1970 G. H. MAY 3,521,033

RECORD CARD READER

Filed July 27, 1966 2 Sheets-Sheet 1

INVENTOR
GORDON H. MAY

By Otto Schmid, Jr.
ATTORNEY

July 21, 1970 G. H. MAY 3,521,038

RECORD CARD READER

Filed July 27, 1966 2 Sheets-Sheet 2

United States Patent Office 3,521,033
Patented July 21, 1970

3,521,033
RECORD CARD READER

Gordon H. May, San Jose, Calif., assignor to International Business Machines Corporation, Armonk, N.Y., a corporation of New York Filed July 27, 1966, Ser. No. 568,216
Int. Cl. F16d 21/02; G06k 7/04; H01h 42/08
U.S. Cl. 235—61.11 7 Claims

ABSTRACT OF THE DISCLOSURE

Manual insertion of a record card initiates the automatically performed cycle of feeding the card to a registering position; sensing the data columns, edge notch data and column emitter signals; ejecting the record card and turning off the record card drive mechanism. A first drive means is utilized to feed the record cards to the registering position and a second drive means is used to move a sensing carriage across the stationary card to sense the data and to restore the sensing carriage in a non-data-sensing position as the card is being ejected.

BACKGROUND OF THE INVENTION

This invention relates to a record card sensing apparatus and more particularly to an improved device for sensing manually inserted record cards.

There are many applications which require the sensing of data from a relatively small number of record cards from each of a relatively large number of stations operating on line to a data processing system. This requirement does not permit the use of most existing record card sensing machines, both from the standpoint of economic consideration, and also from the standpoint of the environmental conditions existing at some of the remote stations. It is, therefore, the principal object of this invention to provide a simple, low cost apparatus to read data from manually inserted record cards and to provide signals representing the data to a data processing system.

It is another object of this invention to provide a card reading apparatus which senses not only the data columns of the card, but which also senses edge notch data and provides a column emitter signal.

It is a further object of this invention to provide a record card sensing apparatus which automatically registers, senses and then ejects record cards.

It is a still further object of this invention to provide a record card sensing apparatus which has an automatic start and automatic stop control.

It is still another object of this invention to provide a record card sensing apparatus which reliably senses damaged record cards.

It is a further object of this invention to provide a record card sensing apparatus having a sensing assembly which sweep lengthwise over the card and provides column data, edge notch data and column emitter signals simultaneously while the card is stationary.

It is another object of this invention to provide an improved selectively actuable drive means for a record card sensing apparatus.

Briefly, according to the invention, there is provided apparatus for sensing the data from manually inserted record cards wherein inserting a card into the reader along a card path actuates a starting means which energizes a first drive means to feed the card to a registration means. The movement of the card to the registration means energizes a second drive means to drive a sensing carriage. Sensing means are provided upon the sensing carriage to read all data rows, edge notch data and to provide a column emitter signal. As the movement of the sensing carriage starts, the first drive means is deenergized and the sensing means are moved to the operative position and then scanned across the card to sense the data punched therein as the sensing carriage is moved across the card. When the sensing carriage reaches the end of the record card, reversing means are actuated to actuate the first and second drive means in the reverse direction to return the card and the sensing carriage to the original position. As the reverse movement of the sensing carriage begins, the sensing means are moved to the inoperative position so that the sensing means do not contact the record card as the sensing carriage is being restored.

The foregoing and other objects, features and advantages of the invention will be apparent from the following more particular descrpition of a preferred embodiment of the invention as illustrated in the acompanying drawings.

Figures 1, 2:
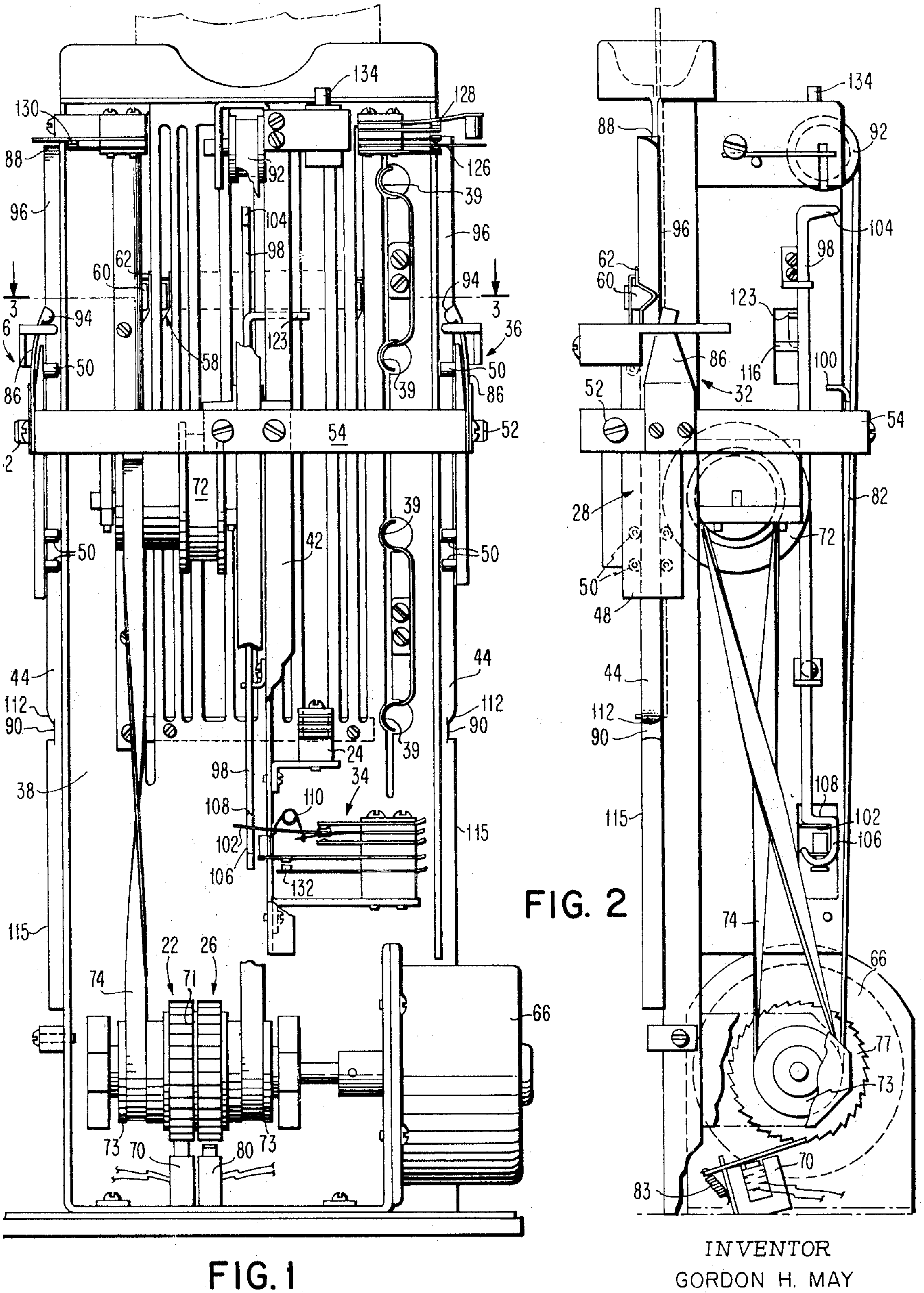
FIG. 1 is a front view of the record card sensing apparatus embodying the invention.
FIG. 2 is a left side view of the record card sensing apparatus embodying the invention.
Figure 3:
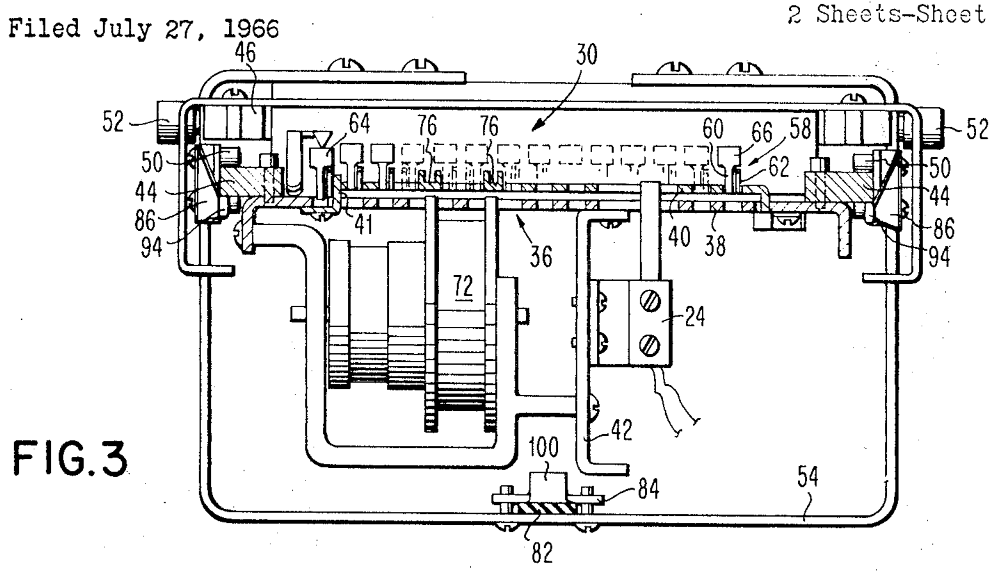
FIG. 3 is a section view taken along the line 3—3 of FIG. 1.
Figure 5:
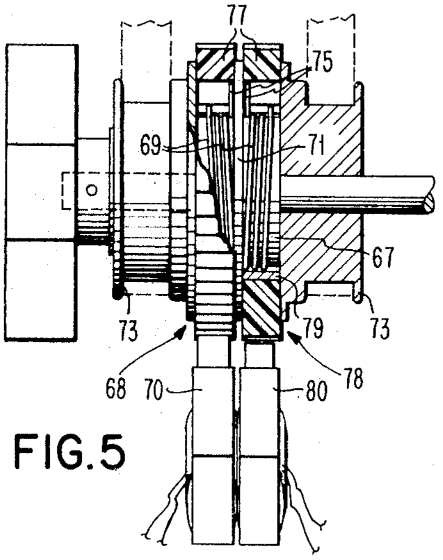
FIG. 5 is a view partially in section showing parts of the drive means in greater detail.
Figure 4:
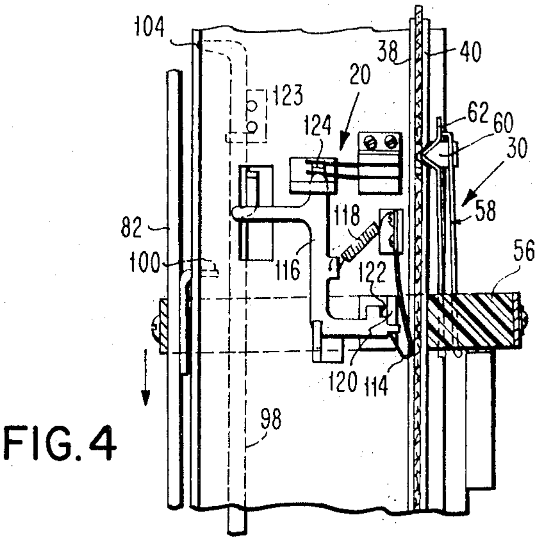
FIG. 4 is a partial right side view of the record card sensing apparatus showing the starting mechanism in greater detail.

Referring to the drawings, the card reader illustrated therein comprises generally, a base member 36 forming a card path. A scanning means 28 is mounted for selective scanning motion along the card path and a sensing means 30 is movably coupled to carriage scanning means 28. Inserting a card into the reader actuates starting means 20 and initiates a cycle of operation which proceeds automatically. The cycle of operation includes energizing a first drive means 22 to drive the card to a reference position, energizing a second feed means 26 to drive sensing means 30 across the card, reversing the drive means to return the card and scanning means 28 to their original position, and turning off the drive means. Signals corresponding to the data punched in the card and column emitter signals are coupled from sensing means 30 to a utilization device, not shown, as the sensing means is scanned across the card. Thus, after the cycle of operation the card is in the same orientation as it was inserted into the reader.

Inserting a record card into the reader actuates starting means 20 which functions to initiate the cycle of operation. It is an important part of the operation of the card reader that the starting means also functions, by means to be described later, to stop the cycle of operation before the card is removed from the reader. Thus, if the card is left in the reader after the sensing operation is completed, the reader is turned off so that no damage results to the card due to continued running of the drive means which may result if merely a card lever contact were used to initiate operation of the reader.

The actuation of the starting means energizes first drive means 22 to feed the card down to a predetermined position at which point the card actuates a switching means 24. The actuation of switching means 24 energizes a second drive means 26. Drive means 26 is coupled to move scanning means 28 and sensing means 30 across the card to read the data punched in the card. Control means 32 is provided to position sensing means 30 relative to scanning means 28 so that the sensing means is in the operative position as the sensing means is scanned across the card. The initial increment of movement of sensing means 30 functions to deenergize first drive means 22 and actuate control means 32. This cycle of operation insures that there is no back-up or bounce back of the card from the predetermined position until the sensing means 30 contact the card. When the sensing means reaches a predetermined position at the end of the card, reversing means 34 is actuated to energize both the first and the second drive means in the opposite direction to thereby eject the card to the partially inserted position and restore the sensing means to the starting position. Control means 32 is actuated to retract the sensing means from the card so that the card can be ejected without interference as the sensing means is restored to its starting position.

In the embodiment of the invention shown in the drawings, the base member comprises two elongated plate members 38, 40 mounted in a spaced apart relation to form a card path therebetween. An upright member 42 is provided for mounting the various control members and member 42 is attached to base plate member 38 at substantially a right angle to provide the support mechanism for the card reader. In accordance with the object of providing a low cost card reader, base plate members 38, 40 and upright member 42 are stamped from sheet metal. This represents a substantial saving in manufacturing cost of a card reader since the elements which define the card path are generally machined to a close tolerance so that the card path is essentially flat. However, the described base member, in combination with the mechanism to be described later, provides a card reader wherein the dimensional tolerances achievable by standard metal stamping operations are sufficient to produce apparatus which reliably senses data from record cards. A pair of guide rails 44 is attached to the marginal edges of base member 38 to mount scanning means 28. Scanning means 28 comprises an elongated body portion 46 which extends across the reader. Body portion 46 is attached at the edges to slide portions 48. The assembly of these parts produces a member extending the width of the reader which is attached for sliding motion adjacent to the card path. This attachment is provided by a plurality of rollers 50 which are mounted on either side of rails 44 from slide portion 48. Sensing means 30 are mounted upon a yoke member 54 which extends around the control mechanism. The yoke member 54 is pivotally attached to scanning means 28 by screws 52. Yoke member 54 comprises a substantially C-shaped member which extends around three sides of the reader and extends far enough around the fourth side to become attached to a sensing block 56. The C-shaped member may be formed of metal; however, the sensing block is preferably made from a nonconductor of electricity so that a plurality of contact members 58 can be mounted in a spaced apart fashion across the sensing block.

Each of the contact assemblies 58 comprises two spaced apart contact members 60, 62 which are normally biased toward each other by spring tension. One of the contact members 62 has a bent portion which is located out of the line of data holes in the record card. The other contact member 60 is located in the line of data holes of the record card and has a pointed portion of a similar shape to the bend in member 62 which keeps the contacts spaced apart. However, when member 62 drops into a hole punched in the card, this permits the contact members to close, thereby closing the electrical circuit to designate to the utilization device that a hole is in the card at that position. This contact assembly permits the sensing of damaged cards since both members of the contact assembly 58 follow the surface of the card due to the force exerted by control means 32. This factor also permits reliable sensing of record card data in the presence of irregularities in the members which define the card path.

The card is maintained in lateral alignment within the reader by resilient guide members 39 which produce a force biasing the card toward contact with aligning portion 41 of base member 40. Base members 38 and 40 each have slots in alignment with the data row positions on a record card so that contact assemblies 58 extend through the slots to contact the record card and sense the data therein. Fourteen contact assemblies 58 are provided—one for each of the twelve possible data holes in a column of data on the card, a contact assembly 64 to provide column emitter data, and a contact assembly 66 to read data comprising notches in the edge of the card. Contact assembly 64 cooperates with a plurality of small openings within base member 38 spaced to coincide with the position of the columns of data on the record card. In this case, the contact member 60 completes a circuit each time an opening is under the contact assembly 64 and the signal generated is coupled to the utilization circuit to designate that a column of the card is in sensing position. An additional contact assembly 66 is provided to read data comprising notches in the edge of the card. This contact assembly operates in a manner similar to that of the other contacts to generate signals which designate to the utilization device the columns of the card which have edge notch data associated therewith.

A first drive means 22 is provided to feed the record cards into the reader and to eject the cards when the card has been read. A second drive means 26 is provided to move the sensing means and the scanning means across the card to sense the data therein and to restore the sensing means and the scanning means to their original position when the card has been read. These operations are under the control of means to be described below.

In the embodiment shown, first drive means 22 comprises on electric motor 66 and a clutch 68 controlled by electromagnet 70 which is operable to couple motor 66 to drive a feed wheel 72 by means of belt 74. Feed wheel 72 extends through slots in base member 38 and opposing portions 76 of base member 40 are bent to a U-shaped cross section to provide sufficient stiffness to produce positive drive to a record card due to the clearance between feed wheel 72 and reinforced portions 76 being less than the thickness of a record card.

In the embodiment shown, clutches 68 and 78 are of the spring clutch type and both clutches are combined into an integral assembly. A drum member 67 is coupled to be driven directly by motor 66. Member 71 is mounted on drum member 67 to separate spring members 69 which are wound around each end of drum member 67. The ends of coil spring members 69 extend upwardly through a loosely fitting slot in flange 79 of drive pulleys 73. One end 75 of spring members 69 extends beyond the drive pulley and is disposed within a slot in ratchet wheels 77. Ratchet wheels 77 are mounted concentrically with drum 67 by means of flanges 79. Electromagnets 70, 80 are mounted so that the armature thereof disengages from a notch of ratchet wheel 77 when the corresponding magnet is energized. When the magnet is deenergized, the armature is held in a notch of ratchet wheel 77 by force of spring 83. Electromagnets 70, 80 provide selective control of clutches 68, 78. When the magnet is deenergized, ratchet wheel 77 is free to rotate in either direction. In this case the edge of the slot in drive pulley 73 engages the end of coil spring 69 and causes the spring to wind about drum 67 and transmit torque to drive wheel 73 in the direction of rotation of the motor. However, when the magnet is energized and ratchet wheel 77 is held, the engagement of end 75 of the spring with the slot in ratchet wheel 77 tends to unwind the spring so that the spring slips on drum 67 and no torque is transmitted when the motor is running in the direction in which the teeth of ratchet wheel 77 are facing. Thus, bidirectional control is exercised by clutches 68, 78 with the use of only one spring per clutch whereas conventional clutches of this type require two springs per clutch.

Second drive means 26 comprises motor 66 and a clutch 78 controlled by electromagnet 80 which is operable to couple motor 66 to drive sensing means 30 across the card by means of belt 82. Belt 82 passes from pulley 73 associated with clutch 78 over a second pulley 92 near the card throat entrance end of the reader. Belt 82 is fixedly attached by coupling means 84 to the side of member 54 so that sensing means 30 is moved across the card when clutch 78 is energized.

Control means 32 is provided to position sensing means 30 in the position operative for sensing data as sensing means 30 is scanned across the card and for positioning sensing means 30 in the inoperative position as sensing means 30 is restored to its original position. In the embodiment shown, control means 32 comprises a pair of resilient arms 86 mounted upon each side of member 54 in position to cooperate with a first notch 88 in guide rails 44 when moving to the sensing position and cooperating with a second notch 90 in guide rails 44 when moving to the restore position. The initial movement of member 54 when drive means 26 is energized, is a pivotal motion of member 54 so that arms 86 pass through notch 88 in guide rail 44. Arms 86 comprise spring members biased toward contact with guide rails 44 and having a thickened end portion 94. The above-described motion causes end portion 94 of arms 86 to be retained back of surface 96 of guide rails 44 as the carriage is scanned across the card. This action provides positive tension to the sensing means so that the sensing members are always biased toward a card following position during the scanning motion of the sensing carriage.

Means are provided to reverse the drive means when the sensing means has reached the end of the record card. In the embodiment shown in the drawings, the means to reverse the drive means comprises a reverse lever 98 positioned to be engaged by a projection 100 which extends from coupling means 84. When projection 100 contacts reverse lever 98 as the sensing carriage is being driven across the card, reverse lever 98 is moved to energize reverse switching means 34. Reverse lever 98 comprises an elongated member mounted for movement in a plane substantially transverse to the base member. Lever 98 comprises an upper end projection 104 extending in the plane of movement of lever 98 into the path of movement of projection 100 and an oppositely disposed C-shaped portion 106 on the other end.

The reverse switch actuating means comprises an arm 102 extending to a position within C-shaped portion 106 of reverse lever 98. When the sensing carriage is moved almost to the end of the travel, projection 100 engages a surface 108 of reverse lever 98 and a slight additional movement causes the reverse lever to move arm 102 and associated contacts which functions to reverse the direction of drive motor 66. Spring 110 functions to retain the contacts in the new position by means of its over-center coupling to arm 102. A second contact serves to reenergize card drive magnet 70 which then energizes clutch 68 to drive the card back out of the reader and, since the scanning carriage clutch is still engaged, the sensing carriage is also driven upward to the starting position. The first increment of motion toward driving the scanning carriage to the starting position causes member 54 to pivot with respect to scanning means 28 and move arms 86 into slot 90 in guide rails 44. Further motion causes arms 86 to be deflected by a ramp 112 machined into the face of guide rails 44 so that the arms 86 ride on the outer surface 115 of rails 44 as the scanning carriage is restored to its initial position. The initial pivoting motion of the sensing means causes the sensing contacts to be moved in a position away from the card path so that the sensing means do not contact the card as the sensing carriage is restored.

Starting means 20 is actuated when a record card is inserted into the reader. Starting means 20 comprises a spring card lever 114 which extends into the card path and is bent to contact a starting member 116. Starting member 116 comprises a substantially L-shaped member channeled within stops to permit limited motion in an up-and-down and side-to-side manner in a plane substantially perpendicular to the card path. A spring 118 is provided to hold the lever against a stop 120. A notched portion 122 is provided in the portion of the lever adjacent stop 120. The movement of spring card lever 114 forces member 116 from stop 120 so that spring 118 causes the lever to be moved upwardly to close a contact 124. This contact energizes the motor drive circuit and the card drive magnet 70 so that motor 66 and the card drive clutch 68 are energized to feed the card down to a registration stop. Starting means 20 is reset by a sidewardly extending reset portion 123 of reverse lever 98. Downward movement of reverse lever 98 restores starting member 116 to a point wherein notch 122 abuts stop 120 due to the force exerted by reset portion 123 which overcomes the force of spring 118. The resetting of starting means 20 is completed when the card is removed from the reader which permits spring card lever 114 to be restored into its notch in member 116.

Figure 6:
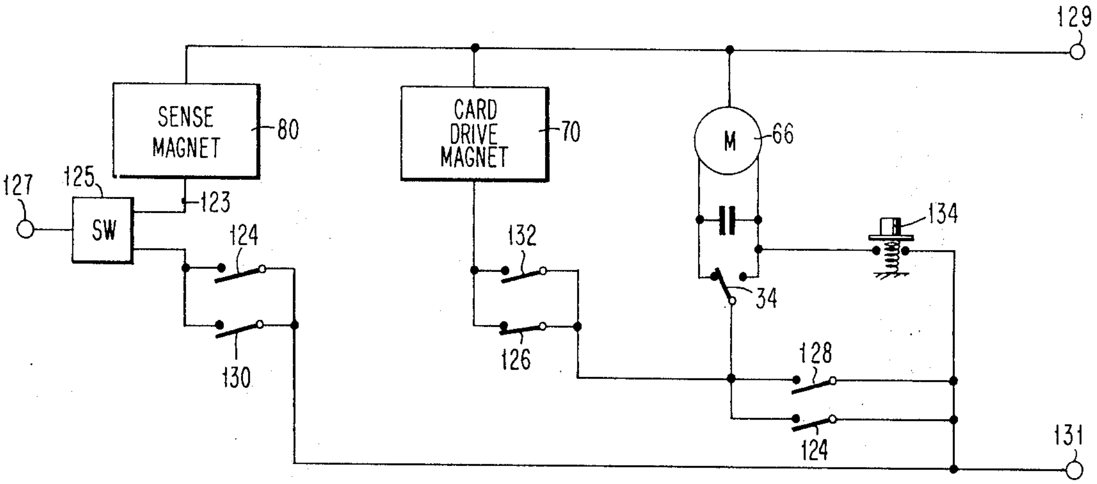
FIG. 6 is a schematic diagram of the control circuit for the record card reader.

A summary of the operation of the card reader coordinated with the circuit diagram of FIG. 6 follows. A card inserted into the card throat to a point about two-thirds down into the reader operates spring card lever 114 to unlatch starting lever 116 from stop 120. Lever 116 is urged by spring member 118 to close contact 124 causing magnet 70 and motor 66 to be energized by means of a suitable voltage applied to terminals 129, 131. This action rotates feed wheel 72 to drive the card downward into the machine to close contact 24 and to stop the card at the registration stop. The closing of contact 24 energizes sense unit drive clutch magnet 80 which results in sensing means 30 being rocked about pivots 52 on scanning means 28, thereby causing the contact assemblies 58 to be loaded against the card. The sensing means is driven downward so that the sensing means scans the cards serially, column by column. The original rocking motion of the sensing means 30 moves spring members 86 to the side of guide rails 44, thereby locking the sensing unit in a position in which the contact assemblies are loaded against the card as it is driven downward. The loading of contact assemblies 58 is released at the end of the scan by the passage of the spring members 86 into notches 90 of guide rails 44. The initial downward movement of scanning mean 28 opens contact 126 to disengage the drive to feed wheel 72, thereby preventing excessive scuffing of the card. At the same time contact 128 is closed to establish a hold circuit for motor 66 and contact 130 also closes to establish a hold circuit for the sense unit drive clutch magnet 80. At the end of the scanning motion of the card, projection 100 on yoke 54 contacts projection 104 of reverse lever 98 which in turn actuates reversing switch 34 and contact 132 to cause the motor to reverse and reenergize card drive clutch magnet 70. Thus, feed wheel 72 drives the card upward to a reject position and the sensing unit is returned to its original position which results in restoration of the reversing lever. Both clutches are disengaged and the motor is turned off. Removal of the card permits spring card lever 114 to restore to the notch in lever 116 so that insertion of another card starts a new cycle. If for any reason a severely damaged card is not completely ejected, a manual eject switch 134 is provided to energize the motor in the eject direction and thereby drive the card out of the reader.

Some applications require that the card be read a column at a time under control of an external control device such as a data processing system, for example. This mode of operation may be achieved by a simple modification comprising the insertion of switching means 125 in line 123. A signal from the external control device is applied to terminal 127 to selectively actuate switching means 125. Switching means 125 may comprise any suitable switching device which is selectively actuable under control of an external signal. However, an electronic switching circuit is preferable due to the ease and precision of the control.

It will be recognized by those skilled in the art that a wide variety of control modes may be used. One suitable control mode is to provide an opening at the zero column position (one column position toward the leading edge of the card from column one) for the emitter contact. Upon receiving the zero column emitter signal, the controlling system decides whether to read the card incrementally or continuously. Since the decision is made at electronic speed, the sensing means can be stopped in position to sense column one if it is decided to sense the card incrementally. The system accomplishes this by sending an OFF level signal to terminal 127. The card is then sensed one or more columns at a time under control of the signal to terminal 127 by the control system. An ON level signal is applied to terminal 127 at all times when the card reader is not being controlled by the external system.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A manual record card reader comprising:

a base member, forming a card path, and having a pair of guides parallel to said card path;

a carriage means slideably mounted on said guides for scanning movement along said card path in a scanning direction and return motion in an opposite direction;

sensing means movably mounted on said carriage means for movement into an operative position while a record card is being scanned and retractable into an inoperative position while said carriage means is returning in said opposite direction;

first drive means for feeding a record card, which has been manually placed in a first position, along said card path to a second position, said first drive means being reversible to feed a card from said second position to said first position;

a second drive means for driving said carriage means in said scanning movement along said carried path from an original position to a predetermined position, said second drive means being reversible to return said carriage to said original position;

starting means mounted to said base member responsive to manual insertion of a record card, in said card path at said first position for energizing said first drive means;

switching means mounted to said base member responsive to a record card reaching said second position, for energizing said second drive means;

control means responsive to said scanning motion of said carriage means for moving said sensing means into said operative position to sense data on a record card at said second position, as said carriage means is moved in a scanning direction along said card path, and for retracting said sensing means to said inoperative position as said carriage means is returned to said original position;

reversing means mounted on said base member and responsive to said carriage having reached said predetermined position, for reversing said first and said second drive means.

2. The record card reader according to claim 1 further comprising reset means mounted to said base member for turning off said first and second drive means when said carriage means reaches said original position.

3. The record card reader according to claim 1 further comprising:

a second switching means connected in series with said first switching means;

means for applying an external control signal to said second switching means to selectively energize and de-energize said second drive means.

4. The record card reader according to claim 1 wherein said first and said second drive means comprise a common motor controllable to run in either forward or reverse directions;

a first and second clutch means, connected to an output shaft of said motor, each of said clutch means adapted to transmit torque in either of said directions;

and electrically actuable control means for selectively actuating said clutch means.

5. The record card reader according to claim 1 wherein said sensing means comprises a plurality of sensing devices mounted upon a yoke member extending around said base member, said yoke member being pivotally attached to said carriage means.

6. A manual card reader comprising:

a base member forming a card path and having a first and second guide parallel to said card path, said first guide having a first relieved portion and a second relieved portion;

carriage means mounted on said first and second guides for scanning movement along said card path in a scanning direction and return movement in an opposite direction;

a plurality of sensing devices mounted upon a yoke member, said yoke member extending around said base member, and being pivotally attached to said carriage means;

a resilient arm member mounted upon said yoke member for cooperation with said first relieved portion in said first guide when said carriage means is in an original position to permit said resilient arm member to pivot and hold said sensing devices in an operative position while said carriage means is moved in said scanning direction to sense data on a record card in said card path, said resilient arm member cooperating with said second relieved portion in said first guide when said carriage means reaches a predetermined position to permit said resilient arm member to ride on an edge portion of the said first guide when said carriage means is moved in said opposite direction for retracting said sensing devices to an inoperative position as said carriage means is returned to said original position;

first drive means for feeding a record card, which has been manually placed in a first position, along said card path to a second position, said first drive means being reversible to feed a card from said second position to said first position;

a second drive means for driving said carriage means in said scanning movement along said card path from said original position to said predetermined position, said drive means being reversible to return said carriage to said original position;

startng means mounted to said base member at said first position, responsive to manual insertion of a record card, for energizing said first drive means;

switching means mounted to said base member at said second position, responsive to a record card reaching said second position, for energizing said second drive means;

reversing means mounted to said base member and responsive to said carriage having reached said predetermined position, for reversing said first and said second drive means.

7. The record card reader according to claim 6 wherein said reversing means further comprises;

a projection mounted upon said yoke member;

a lever having first and second actuating portions mounted on said base member for movement in a first direction and a reverse direction by said projection;

contact means mounted on said base member to be actuated by said first actuating portion when said lever is moved in said reverse direction and to be actuated by said second actuating portion when said lever is moved in said reverse direction;

and means to retain said contact means in the position to which it is moved by said lever.

References Cited

UNITED STATES PATENTS 3,014,093 12/1961 Zenner.
3,060,413 10/1962 Parks.
3,132,241 5/1964 Wolfheimer.
3,243,780 3/1966 Bendick et al.

MAYNARD R. WILBUR, Primary Examiner
THOMAS J. SLOYAN, Assistant Examiner

U.S. Cl. X.R.

192—48.8; 200—46